(12) United States Patent
Shiraishi

(10) Patent No.: US 7,297,936 B2
(45) Date of Patent: Nov. 20, 2007

(54) OPTICAL BEAM SCANNING DEVICE AND IMAGE FORMING APPARATUS

(75) Inventor: Takashi Shiraishi, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 171 days.

(21) Appl. No.: 11/049,973

(22) Filed: Feb. 4, 2005

(65) Prior Publication Data

US 2005/0173625 A1 Aug. 11, 2005

(30) Foreign Application Priority Data

Feb. 6, 2004 (JP) ............................. 2004-030983

(51) Int. Cl.
*H01J 3/14* (2006.01)
*H01J 5/16* (2006.01)
*B41J 15/14* (2006.01)
*G02B 26/08* (2006.01)

(52) U.S. Cl. ...................... 250/234; 250/236; 347/241; 359/204

(58) Field of Classification Search ................ 250/234, 250/235, 236; 359/204; 347/241
See application file for complete search history.

(56) References Cited

U.S. PATENT DOCUMENTS

| | | | |
|---|---|---|---|
| 5,751,462 A | 5/1998 | Shiraishi et al. | |
| 5,774,249 A | 6/1998 | Shiraishi et al. | |
| 5,963,354 A * | 10/1999 | Shiraishi et al. | 359/204 |
| 5,995,268 A * | 11/1999 | Shiraishi et al. | 359/204 |
| 6,055,084 A | 4/2000 | Shiraishi et al. | |
| 6,061,162 A | 5/2000 | Shiraishi et al. | |
| 6,084,699 A | 7/2000 | Shiraishi et al. | |
| 6,104,519 A | 8/2000 | Shiraishi et al. | |
| 6,125,994 A | 10/2000 | Todome | |
| 6,201,625 B1 | 3/2001 | Shiraishi et al. | |
| 6,219,167 B1 | 4/2001 | Shiraishi et al. | |
| 6,337,757 B1 | 1/2002 | Shiraishi et al. | |

(Continued)

FOREIGN PATENT DOCUMENTS

JP 2001-201705 A 7/2001

OTHER PUBLICATIONS

T. Shiraishi, U.S. PTO Office Action, Serial No. 11/727,091, Jul. 5, 2007, 7 pages.

*Primary Examiner*—John R. Lee
(74) *Attorney, Agent, or Firm*—Foley & Lardner LLP

(57) ABSTRACT

It is an object of the present invention to provide an optical beam scanning device and an image forming apparatus which suppress displacement of plural images formed by a different photoconductor in a sub-scanning direction by means of a simple structure even if temperature changes. The optical beam scanning device of the present invention has a single light deflecting device, a pre-deflection optical system that allows light beams from a plurality of light sources to enter the light deflecting device, and a post-deflection optical system including a first optical element for imaging reflected light beams from the light deflecting device on surfaces to be scanned for respective light beams. A second optical element, which has a positive or negative power opposite to a power of the first optical element in a sub-scanning direction, is provided in a position of the pre-deflection optical system where the light beams passes commonly and the light beams enter with distance in the sub-scanning direction.

8 Claims, 19 Drawing Sheets

U.S. PATENT DOCUMENTS

| | | |
|---|---|---|
| 6,347,003 B1 * | 2/2002 | Shiraishi et al. ............. 359/204 |
| 6,392,772 B1 * | 5/2002 | Hama et al. ................. 359/204 |
| 6,392,773 B1 * | 5/2002 | Hama et al. ................. 359/204 |
| 6,452,709 B1 | 9/2002 | Shiraishi et al. |
| 6,683,708 B2 | 1/2004 | Shiraishi et al. |
| 6,778,202 B1 | 8/2004 | Shiraishi et al. |
| 6,791,729 B2 | 9/2004 | Atsuumi et al. |
| 6,903,856 B2 | 6/2005 | Hayashi |
| 6,965,466 B2 * | 11/2005 | Ishihara ..................... 359/212 |
| 6,977,762 B2 | 12/2005 | Hayashi |
| 7,002,759 B2 | 2/2006 | Hama et al. |
| 2002/0196514 A1 | 12/2002 | Atsuumi et al. |
| 2004/0223048 A1 | 11/2004 | Shiraishi et al. |
| 2005/0024479 A1 * | 2/2005 | Itabashi et al. ............. 347/243 |
| 2005/0173625 A1 * | 8/2005 | Shiraishi ..................... 250/234 |
| 2006/0232660 A1 | 10/2006 | Nakajima et al. |
| 2007/0030550 A1 | 2/2007 | Shiraishi |

\* cited by examiner

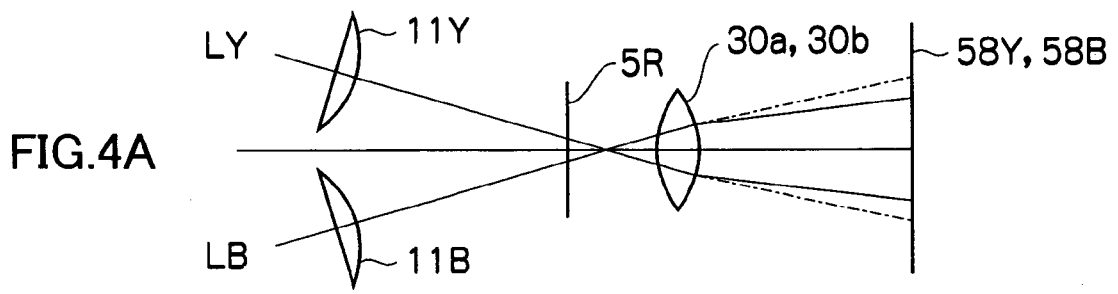
FIG.4A
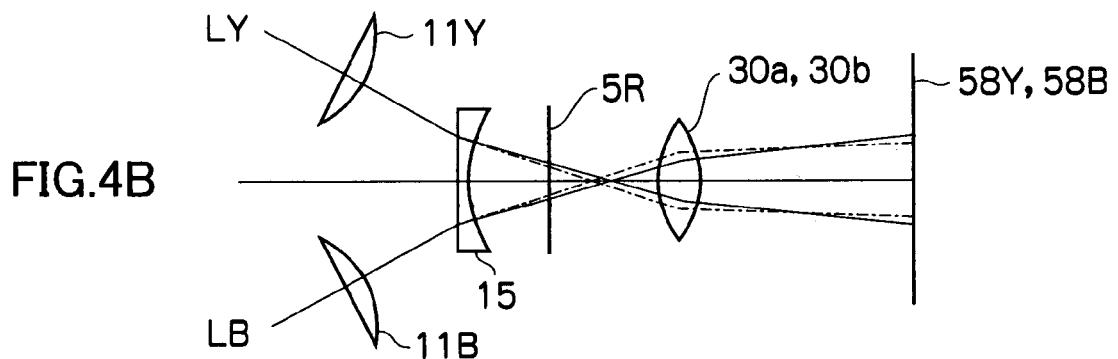
FIG.4B
FIG.5
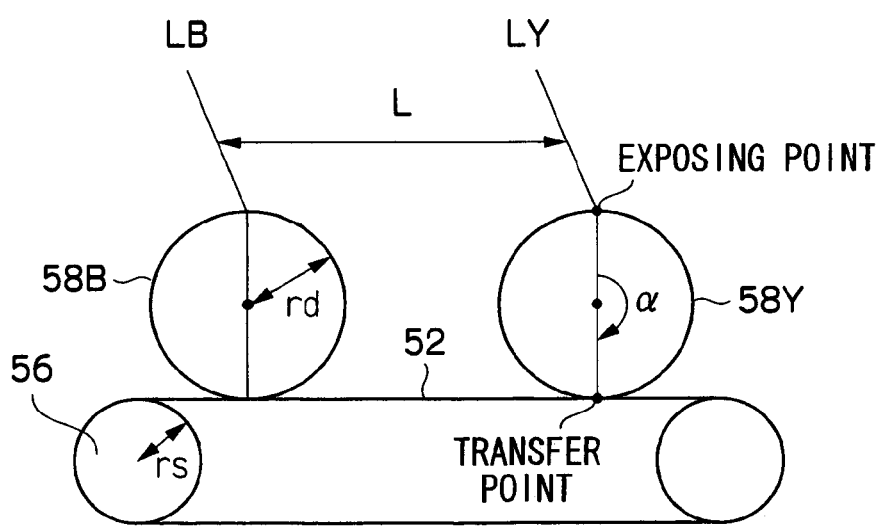

FIG.8

DIAMETER OF INSCRIBED CIRCLE OF POLYGON MIRROR: 40.0

ROTATING CENTER POSITION OF POLYGON MIRROR: Y 17.2, Z 10.1
(POSITION VIEWED FROM LOCAL COORDINATE SYSTEM OF POLYGON REFLECTING SURFACE)

FINITE FOCAL LENS IMAGING POSITION: RAY1 1159.4, RAY2 1106.0, RAY3 1136.0, RAY4 1202.3

GLASS(BK7): 1.514
PLASTIC LENS: 1.507

| | SURFACE No. | CURVATURE | | | TH | | | | REFRACTIVE INDEX N | REMARK |
|---|---|---|---|---|---|---|---|---|---|---|
| | | MAIN SCANNING Cuy | SUB-SCANNING Cuz | COMMON | RAY1 | RAY2 | RAY3 | RAY4 | | |
| PRE-DEFLECTION OPTICAL SYSTEM | 1 | 0 | | 5.0 | 33.3 | 33.3 | 33.3 | 33.3 | | |
| | 2 | | 0.0183 | | | | | | 1.514 | |
| | 3 | | | | −11.6 | −13.3 | −12.7 | −10.1 | | |
| | 4 | | | 67.9 | | | | | | |
| | 5 | | | 10.0 | | | | | 1.514 | |
| | 6 | | | 0.5 | | | | | | |
| | 7 | 0.00122 | 0.00783 | 3.0 | | | | | 1.507 | FIG.10A |
| | 8 | 0.00292 | 0.02973 | 31.2 | | | | | 1.514 | FIG.10B |
| | 9 | | | 2.0 | | | | | | |
| | 10 | | | 11.1 | | | | | | |
| POST-DEFLECTION OPTICAL SYSTEM | 11 | | | −6.8 | | | | | DEFLECTING SURFACE | |
| | 12 | | | −2.0 | | | | | | |
| | 13 | | | −25.3 | | | | | | |
| | 14 | 0.01917 | −0.0698 | −5.6 | | | | | −1.514 | |
| | 15 | 0.02308 | 0.0113 | −129.7 | | | | | −1.507 | FIG.10C |
| | 16 | 0.00098 | −0.0128 | −5.9 | | | | | −1.507 | FIG.10D |
| | 17 | 0.00246 | 0.01158 | −131.5 | | | | | −1.507 | FIG.10E |
| | 18 | | | −2.0 | | | | | −1.514 | FIG.10F |
| | 19 | | | | −0.1 | 0.0 | 0.1 | 0.0 | | |
| | 20 | | | −83.0 | | | | | | |

FIG. 9

DATA ABOUT ECCENTRICITY AND TILT OF EACH LOCAL COORDINATE SYSTEM

<table>
<tr><th rowspan="3">SURFACE No.</th><th colspan="6" >ECCENTRICITY</th><th colspan="5">TILT</th></tr>
<tr><th>y DIRECTION</th><th colspan="4">z DIRECTION</th><th>AROUND z AXIS</th><th colspan="4">AROUND y AXIS</th></tr>
<tr><th>COMMON</th><th>COMMON</th><th>RAY1</th><th>RAY2</th><th>RAY3</th><th>RAY4</th><th>COMMON</th><th>RAY1</th><th>RAY2</th><th>RAY3</th><th>RAY4</th></tr>
<tr><td>1</td><td></td><td></td><td></td><td></td><td></td><td></td><td></td><td>−0.0675</td><td>−0.0136</td><td>0.0153</td><td>0.0675</td></tr>
<tr><td>2</td><td></td><td></td><td>9.1</td><td>1.7</td><td>−2.9</td><td>−9.6</td><td></td><td></td><td></td><td></td><td></td></tr>
<tr><td>3</td><td></td><td></td><td></td><td></td><td></td><td></td><td></td><td></td><td></td><td></td><td></td></tr>
<tr><td>4</td><td></td><td></td><td></td><td></td><td></td><td></td><td></td><td></td><td></td><td></td><td></td></tr>
<tr><td>5</td><td></td><td></td><td></td><td></td><td></td><td></td><td></td><td></td><td></td><td></td><td></td></tr>
<tr><td>6</td><td></td><td></td><td></td><td></td><td></td><td></td><td></td><td></td><td></td><td></td><td></td></tr>
<tr><td>7</td><td></td><td>−0.2</td><td></td><td></td><td></td><td></td><td></td><td></td><td></td><td></td><td></td></tr>
<tr><td>8</td><td></td><td>0.2</td><td></td><td></td><td></td><td></td><td></td><td></td><td></td><td></td><td></td></tr>
<tr><td>9</td><td></td><td></td><td></td><td></td><td></td><td></td><td>−1.0197</td><td></td><td></td><td></td><td></td></tr>
<tr><td>10</td><td>−1.4</td><td></td><td></td><td></td><td></td><td></td><td>1.0197</td><td></td><td></td><td></td><td></td></tr>
<tr><td colspan="12">DEFLECTING SURFACE</td></tr>
<tr><td>11</td><td></td><td></td><td></td><td></td><td></td><td></td><td>−1.0197</td><td></td><td></td><td></td><td></td></tr>
<tr><td>12</td><td></td><td></td><td></td><td></td><td></td><td></td><td></td><td></td><td></td><td></td><td></td></tr>
<tr><td>13</td><td></td><td></td><td></td><td></td><td></td><td></td><td></td><td></td><td></td><td></td><td></td></tr>
<tr><td>14</td><td></td><td></td><td></td><td></td><td></td><td></td><td></td><td></td><td></td><td></td><td></td></tr>
<tr><td>15</td><td></td><td></td><td></td><td></td><td></td><td></td><td></td><td></td><td></td><td></td><td></td></tr>
<tr><td>16</td><td></td><td></td><td></td><td></td><td></td><td></td><td></td><td></td><td></td><td></td><td></td></tr>
<tr><td>17</td><td></td><td></td><td></td><td></td><td></td><td></td><td></td><td></td><td></td><td></td><td></td></tr>
<tr><td>18</td><td></td><td></td><td></td><td></td><td></td><td></td><td></td><td>−0.4485</td><td>−0.2592</td><td>−0.0941</td><td>0.4103</td></tr>
<tr><td>19</td><td></td><td></td><td></td><td></td><td></td><td></td><td></td><td>0.4485</td><td>0.2592</td><td>0.0941</td><td>−0.4103</td></tr>
<tr><td>20</td><td></td><td></td><td></td><td></td><td></td><td></td><td></td><td></td><td></td><td></td><td></td></tr>
</table>

Rows 1–10: PRE-DEFLECTION OPTICAL SYSTEM
Rows 11–20: POST-DEFLECTION OPTICAL SYSTEM

FIG.10A

| n\m | 0 | 1 | 2 | 3 | 4 | 5 | 6 | 7 | 8 | 9 |
|---|---|---|---|---|---|---|---|---|---|---|
| 0 | 0 | 0 | 0 | 0 | 0 | 0 | 0 | 0 | 0 | 0 |
| 2 | -0.00099 | 0 | -0.00018 | 0 | 1.2E-06 | 0 | -1.6E-08 | 0 | 0 | 0 |
| 4 | -3.9E-06 | 0 | 1.11E-06 | 0 | -9.8E-09 | 0 | -6.8E-10 | 0 | 0 | 0 |
| 6 | -2.1E-08 | 0 | -1.4E-08 | 0 | 7.34E-10 | 0 | 3.89E-11 | 0 | 0 | 0 |

FIG.10B

| n\m | 0 | 1 | 2 | 3 | 4 | 5 | 6 | 7 | 8 | 9 |
|---|---|---|---|---|---|---|---|---|---|---|
| 0 | 0 | 0 | 0 | 0 | 0 | 0 | 0 | 0 | 0 | 0 |
| 2 | 0.000168 | 0 | -0.0003 | 0 | 1.4E-08 | 0 | 4.4E-09 | 0 | 0 | 0 |
| 4 | -6.2E-06 | 0 | 9.41E-07 | 0 | 3.1E-08 | 0 | 1.67E-09 | 0 | 0 | 0 |
| 6 | 2.73E-08 | 0 | 2.84E-08 | 0 | -1.1E-10 | 0 | -3.3E-11 | 0 | 0 | 0 |
| 8 | | 0 | 1.07E-10 | 0 | -3E-11 | 0 | 3.37E-13 | 0 | 0 | 0 |

FIG.10C

| n\m | 0 | 1 | 2 | 3 | 4 | 5 | 6 | 7 | 8 | 9 | 10 |
|---|---|---|---|---|---|---|---|---|---|---|---|
| 0 | 0 | 0.00945 | 0.000722 | -5E-06 | -2.8E-06 | 1.3E-10 | 5.85E-09 | 7.6E-12 | -7.8E-12 | -1E-14 | 2.75E-15 |
| 2 | 0.0163347 | 8.55E-05 | -1.5E-05 | 1.74E-07 | -1.5E-08 | -2.3E-10 | 2.76E-10 | 3.23E-13 | -6.9E-14 | -2.3E-16 | 7.59E-17 |
| 4 | 0.000288 | -1.3E-07 | -2.4E-07 | -6.1E-09 | -1.6E-09 | 2.52E-11 | 9.48E-12 | -1.3E-14 | -1.5E-15 | -5E-17 | -1.1E-17 |
| 6 | -4.2E-06 | -2.9E-09 | 3.71E-08 | 3.55E-10 | -5.5E-11 | -1.1E-12 | -3.5E-13 | -4.3E-15 | 8.15E-16 | 9.46E-18 | -4.6E-19 |
| 8 | 3.71E-08 | 4.67E-10 | -7.8E-10 | -4.5E-12 | 3.79E-12 | -1.2E-14 | -4.6E-15 | 1.45E-16 | -3.2E-18 | -2E-19 | 6.55E-21 |

FIG.10D

| n\m | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 0 | 0.005489 | 0.001004 | -4.6E-06 | -2.3E-06 | -2.2E-09 | 2.98E-09 | 5.38E-12 | -2.4E-12 | -4.5E-15 | -5.8E-16 | 0 | 0 |
| 2 | -0.00277 | 8.87E-05 | -4.8E-06 | 1.25E-07 | -8.5E-09 | -5.4E-11 | 1.77E-10 | 4.32E-14 | -8.2E-14 | 8.43E-17 | 5.8E-17 | 0 | 0 |
| 4 | 0.000233 | -3.8E-07 | -1.8E-08 | -5.1E-09 | -2E-09 | 2.67E-11 | 3.81E-12 | -3.6E-14 | 1.11E-14 | -2.6E-17 | -1.5E-17 | 0 | 0 |
| 6 | -6.3E-06 | 8E-09 | 2.18E-08 | 2.4E-10 | 5.03E-11 | -1.2E-12 | -3.4E-13 | -4E-16 | 2.49E-16 | 3.45E-18 | 5.23E-20 | 0 | 0 |
| 8 | 5.24E-08 | -2.6E-10 | -5.6E-10 | 3.06E-12 | 2.05E-12 | -2.5E-14 | -2.3E-15 | 9.25E-17 | 9.32E-19 | -9.8E-20 | 1.49E-22 | 0 | 0 |

FIG.10E

| n\m | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 0 | -0.00538 | 0.001464 | 4.46E-07 | -1E-07 | 3.35E-11 | 1.34E-11 | 2.62E-15 | -8.2E-16 | 1.7E-19 | -2.6E-21 | -4.1E-24 | 4.44E-25 |
| 2 | 0.001464 | -4.9E-06 | 4.02E-07 | -3.4E-10 | 6.72E-11 | -1.3E-13 | 1.1E-14 | -1.5E-18 | -1.1E-18 | 5.92E-23 | 2.97E-23 | 1.35E-26 | 3.51E-28 |
| 4 | 4.83E-06 | -3.8E-09 | -4.4E-10 | -2E-12 | 3.63E-14 | -6.5E-17 | 1.72E-17 | -9.6E-21 | 4.26E-22 | 6.72E-24 | -4.9E-26 | -2.9E-28 | -5.7E-30 |
| 6 | 3.43E-09 | 1.98E-10 | -2.5E-12 | 1.27E-15 | -5E-16 | -8.7E-20 | 9.2E-20 | 2.07E-23 | 2.25E-23 | -5.5E-27 | 1.12E-27 | 5.88E-30 | -1E-31 |
| 8 | 6.8E-11 | -1.5E-13 | -4.3E-15 | -1.8E-16 | -6.5E-18 | -2.8E-21 | -2.3E-22 | 1.78E-24 | 7.66E-26 | 9.08E-29 | -2.4E-30 | -3.8E-33 | -5.9E-34 |

FIG.10F

| n\m | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 0 | -0.00753 | -0.00082 | 6E-07 | -5.7E-09 | 2.38E-11 | 2.29E-12 | 1.48E-15 | 3.23E-16 | 3.94E-19 | -6.4E-20 | -7.5E-24 | 1.53E-24 |
| 2 | -0.00196 | -4.9E-06 | 2.1E-07 | -2.3E-10 | 4.25E-11 | -1.2E-13 | -2.5E-15 | -1.9E-18 | -1.5E-18 | 1.69E-22 | -1.8E-25 | -2.2E-26 | 9.23E-28 |
| 4 | 3.37E-06 | -4.4E-09 | -2.8E-10 | -2.3E-12 | 7.38E-14 | 2.05E-16 | -5.2E-18 | -4.3E-20 | 2.17E-21 | 1.63E-24 | -4.2E-26 | 4.11E-28 | -5.4E-30 |
| 6 | 4.89E-09 | 1.91E-10 | -3.5E-12 | -3.1E-15 | 1.72E-16 | 3.34E-19 | -8.8E-21 | 1.97E-23 | 2.11E-23 | 1.7E-26 | 1.37E-27 | 2.68E-30 | -7.9E-32 |
| 8 | 5.81E-11 | -1.9E-13 | 7.99E-16 | -1.2E-16 | -8.2E-18 | -4.9E-21 | 3.17E-22 | -3E-25 | 2.01E-26 | 2.39E-28 | -2.6E-30 | 2.21E-33 | -3.2E-34 |

FIG.11

| | PARAXIAL CURVATURE | | EACH SURFACE POWER | | EQUIVALENT INTERVAL | PARAXIAL POWER AS LENS |
|---|---|---|---|---|---|---|
| | INCIDENT SURFACE | EMISSION SURFACE | INCIDENT SURFACE | EMISSION SURFACE | | |
| MAIN SCANNING | 8.630E-04 | 2.324E-03 | 4.37E-04 | -1.18E-03 | 1.99096 | -0.000739667 |
| SUB-SCANNING | 5.855E-03 | 3.007E-02 | 2.97E-03 | -1.52E-02 | 1.99096 | -0.012181346 |

FIG.12

CHANGE AMOUNT WHEN TEMPERATURE RISES BY 15°C

| | BEAM POSITION IN SUB-SCANNING DIRECTION | DEFOCUS IN MAIN SCANNING DIRECTION | DEFOCUS IN SUB-SCANNING DIRECTION | BEAM POSITION (BP) IN SUB-SCANNING DIRECTION | $\alpha_H \times BP \times t$ | DIFFERENCE OF CHANGE AMOUNT OF RAY4 STANDARD BEAM INTERVAL $-\alpha_H \times BP \times t$ |
|---|---|---|---|---|---|---|
| ray1 | 0.018 | 0.3 | 0.2 | 7.7 | 0.002 | 0.025 |
| ray2 | 0.007 | 0.2 | 0.1 | 0.3 | 0.000 | 0.016 |
| ray3 | 0.003 | 0.2 | 0.2 | -6.0 | -0.002 | 0.014 |
| ray4 | -0.012 | 0.3 | 0.1 | -10.2 | -0.003 | 0.000 |

MOVING AMOUNT OF RAY1 IN SUB-SCANNING DIRECTION−MOVING AMOUNT OF RAY4 IN SUB-SCANNING DIRECTION−($\alpha_H \times BP \times t$ OF RAY1 − $\alpha_H \times BP \times t$ OF RAY4)   0.025

FIG. 13

DIAMETER OF INSCRIBED CIRCLE OF POLYGON MIRROR  40.0

ROTATING CENTER POSITION OF POLYGON MIRROR  Y 17.2  Z 10.1
(POSITION VIEWED FROM LOCAL COORDINATE SYSTEM OF POLYGON REFLECTING SURFACE)

LIMITED FOCAL LENS FROM IMAGING POSITION  RAY1 1062.8  RAY2 996.9  RAY3 1014.0  RAY4 1063.1

| | SURFACE No. | CURVATURE MAIN SCANNING Cuy | CURVATURE SUB-SCANNING Cuz | TH COMMON | TH RAY1 | TH RAY2 | TH RAY3 | TH RAY4 | REFRACTIVE INDEX N | REMARK |
|---|---|---|---|---|---|---|---|---|---|---|
| PRE-DEFLECTION OPTICAL SYSTEM | 1 | | | | 33.3 | 33.3 | 33.3 | 33.3 | | |
| | 2 | 0 | 0.0183 | 5.0 | | | | | 1.514 | |
| | 3 | | | | −11.3 | −13.9 | −13.5 | −11.4 | | |
| | 4 | | | 67.9 | | | | | | |
| | 5 | | | 10.0 | | | | | 1.514 | |
| | 6 | | | 0.5 | | | | | | |
| | 7 | 0.00118 | 0.00775 | 3.0 | | | | | 1.507 | FIG.15A |
| | 8 | 0.00295 | 0.02979 | 31.0 | | | | | | FIG.15B |
| | 9 | | | 2.0 | | | | | 1.514 | |
| | 10 | | | 11.1 | | | | | | |

GLASS(BK7) : 1.514
PLASTIC LENS : 1.507

FIG.14

DATA ABOUT ECCENTRICITY AND TILT OF EACH LOCAL COORDINATE SYSTEM

| | | ECCENTRICITY | | | | | | TILT | | | |
|---|---|---|---|---|---|---|---|---|---|---|---|
| SURFACE No. | y DIRECTION COMMON | z DIRECTION | | | | | AROUND z AXIS | AROUND y AXIS | | | |
| | | COMMON | RAY1 | RAY2 | RAY3 | RAY4 | COMMON | RAY1 | RAY2 | RAY3 | RAY4 |
| 1 | | | 9.0 | 1.7 | -2.7 | -9.1 | | -0.0644 | -0.0132 | 0.0151 | 0.0644 |
| 2 | | | | | | | | | | | |
| 3 | | | | | | | | | | | |
| 4 | | | | | | | | | | | |
| 5 | | | | | | | | | | | |
| 6 | | | | | | | | | | | |
| 7 | | 0.1 | | | | | | | | | |
| 8 | | -0.1 | | | | | | | | | |
| 9 | | | | | | | -1.0197 | | | | |
| 10 | -1.4 | | | | | | 1.0197 | | | | |

PRE-DEFLECTION OPTICAL SYSTEM

FIG.15A

| m\n | 0 | 1 | 2 | 3 | 4 | 5 | 6 |
|---|---|---|---|---|---|---|---|
| 0 | 0 | 0 | −0.00022 | 0 | 1.2E−06 | 0 | −2.1E−08 |
| 2 | −0.0011 | 0 | 1.09E−06 | 0 | −7.3E−09 | 0 | −3.2E−10 |
| 4 | −4.4E−06 | 0 | −1.5E−08 | 0 | 7.66E−10 | 0 | 4.22E−11 |
| 6 | −2.2E−08 | 0 | 4.01E−11 | 0 | 3.13E−11 | 0 | −1.5E−13 |

FIG.15B

| m\n | 0 | 1 | 2 | 3 | 4 | 5 | 6 |
|---|---|---|---|---|---|---|---|
| 0 | 0 | 0 | −0.00026 | 0 | 1.41E−06 | 0 | −3E−09 |
| 2 | 0.000299 | 0 | 9.59E−07 | 0 | 2.92E−08 | 0 | 1.58E−09 |
| 4 | −5.6E−06 | 0 | 2.94E−08 | 0 | −2.6E−10 | 0 | −3.7E−11 |
| 6 | 2.96E−08 | 0 | 1.75E−10 | 0 | −3.1E−11 | 0 | 5.83E−13 |

FIG.16

| | PARAXIAL CURVATURE | | EACH SURFACE POWER | | EQUIVALENT INTERVAL | PARAXIAL POWER AS LENS |
|---|---|---|---|---|---|---|
| | INCIDENT SURFACE | EMISSION SURFACE | INCIDENT SURFACE | EMISSION SURFACE | | |
| MAIN SCANNING | 7.305E-04 | 2.433E-03 | 3.70E-04 | -1.23E-03 | 1.99096 | -0.000861679 |
| SUB-SCANNING | 5.542E-03 | 3.039E-02 | 2.81E-03 | -1.54E-02 | 1.99096 | -0.012508064 |

FIG.17

CHANGE AMOUNT WHEN TEMPERATURE RISES BY 15°C

| | BEAM POSITION IN SUB-SCANNING DIRECTION | DEFOCUS IN MAIN SCANNING DIRECTION | DEFOCUS IN SUB-SCANNING DIRECTION | BEAM POSITION (BP) IN SUB-SCANNING DIRECTION | | $\alpha_H \times BP \times t$ | DIFFERENCE OF CHANGE AMOUNT OF RAY4 STANDARD BEAM INTERVAL $-\alpha_H \times BP \times t$ |
|---|---|---|---|---|---|---|---|
| | | | | | $\alpha_H$ | | |
| ray1 | 0.000 | 0.2 | 0.0 | 9.4 | | 0.003 | −0.005 |
| ray2 | 0.000 | 0.1 | 0.0 | 1.1 | | 0.000 | −0.002 |
| ray3 | 0.004 | 0.1 | 0.1 | −5.2 | | −0.002 | 0.004 |
| ray4 | −0.001 | 0.2 | 0.0 | −9.4 | | −0.003 | 0.000 |

MOVING AMOUNT OF RAY1 IN SUB-SCANNING DIRECTION−MOVING AMOUNT OF RAY4 IN SUB-SCANNING DIRECTION−($\alpha_H \times BP \times t$ OF RAY1 − $\alpha_H \times BP \times t$ OF RAY4)   −0.005

FIG.18

DIAMETER OF INSCRIBED CIRCLE OF POLYGON MIRROR  40.0

ROTATING CENTER POSITION OF POLYGON MIRROR  Y 17.2  Z 10.1
(POSITION VIEWED FROM LOCAL COORDINATE SYSTEM OF POLYGON REFLECTING SURFACE)

FINITE FOCAL LENS IMAGING POSITION

| | | RAY1 | RAY2 | RAY3 | RAY4 |
|---|---|---|---|---|---|
| | | 5518.7 | 4106.4 | 4336.0 | 5579.3 |

| | | CURVATURE | | TH | | | | REFRACTIVE INDEX N | REMARK |
|---|---|---|---|---|---|---|---|---|---|
| | SURFACE No. | MAIN SCANNING CUY | SUB-SCANNING CUZ | COMMON | RAY1 | RAY2 | RAY3 | RAY4 | | |
| PRE-DEFLECTION OPTICAL SYSTEM | 1 | | | | 33.3 | 33.3 | 33.3 | 33.3 | | |
| | 2 | 0 | 0.0183 | 5.0 | -0.2 | -3.1 | -2.6 | -0.1 | 1.514 | |
| | 3 | | | 67.9 | | | | | | |
| | 4 | | | 10.0 | | | | | 1.514 | |
| | 5 | | | 14.3 | | | | | | |
| | 6 | | | 2.0 | | | | | 1.504 | |
| | 7 | | | 11.1 | | | | | | |
| | 8 | | | | | | | | | |

GLASS(BK7) : 1.514
PLASTIC LENS : 1.507

FIG.19

DATA ABOUT ECCENTRICITY AND TILT OF EACH LOCAL COORDINATE SYSTEM

<table>
<tr><th rowspan="3">SURFACE No.</th><th colspan="6">ECCENTRICITY</th><th colspan="5">TILT</th></tr>
<tr><th rowspan="2">y DIRECTION<br>COMMON</th><th colspan="4">z DIRECTION</th><th>AROUND z AXIS</th><th colspan="4">AROUND y AXIS</th></tr>
<tr><th>COMMON</th><th>RAY1</th><th>RAY2</th><th>RAY3</th><th>RAY4</th><th>COMMON</th><th>RAY1</th><th>RAY2</th><th>RAY3</th><th>RAY4</th></tr>
<tr><td>1</td><td></td><td></td><td>5.3</td><td>0.5</td><td>-1.9</td><td>-5.3</td><td></td><td>-0.0216</td><td>0.0009</td><td>0.0042</td><td>0.0216</td></tr>
<tr><td>2</td><td></td><td></td><td></td><td></td><td></td><td></td><td></td><td></td><td></td><td></td><td></td></tr>
<tr><td>3</td><td></td><td></td><td></td><td></td><td></td><td></td><td></td><td></td><td></td><td></td><td></td></tr>
<tr><td>4</td><td></td><td></td><td></td><td></td><td></td><td></td><td></td><td></td><td></td><td></td><td></td></tr>
<tr><td>5</td><td></td><td></td><td></td><td></td><td></td><td></td><td></td><td></td><td></td><td></td><td></td></tr>
<tr><td>6</td><td></td><td></td><td></td><td></td><td></td><td></td><td>-1.0197</td><td></td><td></td><td></td><td></td></tr>
<tr><td>7</td><td></td><td></td><td></td><td></td><td></td><td></td><td>1.0197</td><td></td><td></td><td></td><td></td></tr>
<tr><td>8</td><td>-1.4</td><td></td><td></td><td></td><td></td><td></td><td></td><td></td><td></td><td></td><td></td></tr>
</table>

PRE-DEFLECTION OPTICAL SYSTEM

FIG.20

| | PARAXIAL CURVATURE | | EACH SURFACE POWER | | EQUIVALENT INTERVAL | PARAXIAL POWER AS LENS |
|---|---|---|---|---|---|---|
| | INCIDENT SURFACE | EMISSION SURFACE | INCIDENT SURFACE | EMISSION SURFACE | | |
| MAIN SCANNING | 0.000E+00 | 0.000E+00 | 0.00E+00 | 0.00E+00 | 0 | 0 |
| SUB-SCANNING | 0.000E+00 | 0.000E+00 | 0.00E+00 | 0.00E+00 | 0 | 0 |

FIG.21

CHANGE AMOUNT WHEN TEMPERATURE RISES BY 15°C

| | BEAM POSITION IN SUB-SCANNING DIRECTION | DEFOCUS IN MAIN SCANNING DIRECTION | DEFOCUS IN SUB-SCANNING DIRECTION | BEAM POSITION (BP) | $\alpha_H \times BP \times t$ | | DIFFERENCE OF CHANGE AMOUNT OF INTERVAL $-\alpha_H \times BP \times t$ |
|---|---|---|---|---|---|---|---|
| ray1 | 0.045 | 0.7 | 1.9 | 7.4 | 0.002 | | 0.084 |
| ray2 | 0.005 | 0.7 | 2.0 | 0.5 | 0.000 | | 0.047 |
| ray3 | −0.017 | 0.7 | 2.0 | −5.1 | −0.002 | | 0.027 |
| ray4 | −0.045 | 0.7 | 1.9 | −9.1 | −0.003 | | 0.000 |

MOVING AMOUNT OF RAY1 IN SUB-SCANNING DIRECTION−MOVING AMOUNT OF RAY4 IN SUB-SCANNING DIRECTION−($\alpha_H \times BP \times t$ OF RAY1 − $\alpha_H \times BP \times t$ OF RAY4)   0.084

OPTICAL BEAM SCANNING DEVICE AND IMAGE FORMING APPARATUS

BACKGROUND OF THE INVENTION

The invention relates to an image forming apparatus such as a laser printer and a digital copying machine, and an optical beam scanning device that can be used in the image forming apparatus.

For example, a color image forming apparatus of plural drum type is constituted so that a plurality of images are created on photoconductor drums, the images are overlapped with one another on a recording medium, and one image is formed. The apparatus utilizes a plurality of image forming sections corresponding to separated color components, and an optical beam scanning device (laser exposing device). The optical beam scanning device provides image data corresponding to the color components, namely, a plurality of laser beams to the image forming sections.

In such a color image forming apparatus, it is necessary to suitably establish a positional relationship of the images on the photoconductor drums, particularly the positional relationship in a sub-scanning direction in order to realize a color image without color shift (color registration error). A lot of optical elements, however, intervene between light sources and the photoconductor drums, and the optical elements are influenced by ambient temperature and humidity, thereby occasionally causing color shift.

In order to suppress the color shift in the sub-scanning direction (displacement between the color component images), the method disclosed in U.S. Pat. No. 6,337,757 is proposed.

In this method, pre-deflection optical systems for respective color components, which are provided between light sources for the color components and a deflector shared by the color components, are provided with a hybrid cylinder lens. The hybrid cylinder lens is composed of a glass cylinder lens having a positive power in the sub-scanning direction through which light beams transmit with eccentricity and tilt, and a plastic cylinder lens having a negative power in the sub-scanning direction. As a result, displacement in the sub-scanning direction due to a change in the ambient temperature is suppressed for each color component.

In the above conventional method, however, the plastic cylinder lens should be provided for each color component (when the color components are yellow, magenta, cyan and black, four plastic cylinder lenses), thereby making the apparatus complicated and expensive.

When the hybrid cylinder lens is moved to an optical axial direction for focus adjustment that focuses the beams on image surfaces (surfaces of the photoconductor drums), the hybrid cylinder lens allows the light beams to transmit with eccentricity and tilt. For this reason, emitting positions on the image surfaces (beam positions) are changed.

SUMMARY OF THE INVENTION

It is an object of the present invention to provide an optical beam scanning device and an image forming apparatus that are capable of compensating a shift of beam positions of images in a sub-scanning direction caused by a change in use environment by simple structure and suppressing the displacement between the images.

A first aspect of the invention is an optical beam scanning device including: a single light deflecting device; a pre-deflection optical system that allows light beams from a plurality of light sources to enter the light deflecting device; and a post-deflection optical system including a first optical element for imaging the reflected light beams from the light deflecting device on surfaces to be scanned for the respective light beams, characterized in that a second optical element having a positive or negative power opposite to a power of the first optical element in a sub-scanning direction is provided in a position of the pre-deflection optical system which allows the light beams from the light sources to pass therethrough and allows the light beams from the light sources to enter in the sub-scanning direction with distance.

A second aspect of the invention is an optical beam scanning device characterized by including a plurality of optical elements that are arranged on a housing and give a plurality of scanning lines to a plurality of photoconductor with an internal L, wherein linear expansion coefficients of the housing, a frame for locating the photoconductor and a shaft for driving a belt on which images developed on the photoconductor drums are overlapped are designated by $\alpha H$, $\alpha F$ and $\alpha S$, respectively, and when an interval between the beams positions on surfaces to be scanned in a sub-scanning direction at the time of developing an optical path reflection from a deflecting surface to the surfaces to be scanned is designated by BP, characteristics of components are selected so that positions of the beams in the sub-scanning direction are shifted only by $-(\alpha H - 2 \times \alpha F + \alpha S) \times L + \alpha H \times BP$ per unit temperature.

A third aspect of the invention is an optical beam scanning device characterized by including: a single light deflecting device; a pre-deflection optical system that allows light beams from a plurality of light sources to enter the light deflecting device; and a post-deflection optical system including a first optical element for imaging reflecting light beams from the light deflecting device on surfaces to be scanned for respective light beams, wherein characteristics of components including the light deflecting device, the pre-deflection optical system and the post-deflection optical system are selected so that intervals of the light beams from the light sources on the surfaces to be scanned at the time of developing an optical path reflection from a deflecting surface to the surfaces to be scanned become small when temperature rises.

According to the optical beam scanning device and the image forming apparatus of the present invention, even when ambient environment such as temperature changes, displacement of the images formed by different photoconductor drums in the sub-scanning direction can be suppressed by a simple structure.

BRIEF DESCRIPTION OF THE DRAWINGS

FIGS. 4A and 4B are explanatory diagrams illustrating functions of an environment change compensating optical element 15;

FIG. 5 is an explanatory diagram illustrating a normal state of various parameters influenced by temperature change;

FIG. 8 is a chart illustrating curvature, interval, refractive index of respective optical elements, and the like on an optical axis on each surface of the optical elements according to a first concrete example of the embodiment;

FIG. 9 is a chart illustrating eccentricity and tilt amount of the optical elements according to the first concrete example of the embodiment;

FIGS. 10A to 10F are charts illustrating curved surface polynomial coefficient of each surface of each optical element according to the first concrete example of the embodiment;

FIG. 11 is a chart illustrating a paraxial power characteristic of the environment change compensating optical element 15 according to the first concrete example of the embodiment;

FIG. 12 is a chart illustrating a change of the positions when temperature rises by 15° C. according to the first concrete example of the embodiment;

FIG. 13 is a chart illustrating curvature, interval, refractive index of the respective optical elements on the optical axis on the surfaces of the optical elements according to a second concrete example of the embodiment;

FIG. 14 is a chart illustrating eccentricity and tilt amount of the optical elements according to the second concrete example of the embodiment;

FIGS. 15A and 15B are charts illustrating curved surface polynomial coefficient of each surface of each optical element according to the second concrete example of the embodiment;

FIG. 16 is a chart illustrating a paraxial power characteristic of the environment change compensating optical element 15 according to the second concrete example of the embodiment;

FIG. 17 is a chart illustrating a change of the positions when temperature rises by 15° C. according to the second concrete example of the embodiment;

FIG. 18 is a chart illustrating curvature, interval, refractive index of the respective optical elements on the optical axis on the surfaces of the optical elements according to a comparative example of the embodiment;

FIG. 19 is a chart illustrating eccentricity and tilt amount of the optical elements according to the comparative example of the embodiment;

FIG. 20 is a chart illustrating a paraxial power characteristic of the environment change compensating optical element 15 according to the comparative example of the embodiment; and FIG. 21 is a chart illustrating a change of the positions when temperature rises by 15° C. according to the comparative example of the embodiment.

DETAILED DESCRIPTION OF THE PREFERRED EMBODIMENTS

An optical beam scanning device and an image forming apparatus according to preferable embodiments of the present invention are explained below with reference to the drawings.

(A) One Embodiment

The optical beam scanning device and the image forming apparatus according to one embodiment of the present invention will be explained. The optical beam scanning device according to the embodiment is a multi-beam optical scanning device.

Figure 1:
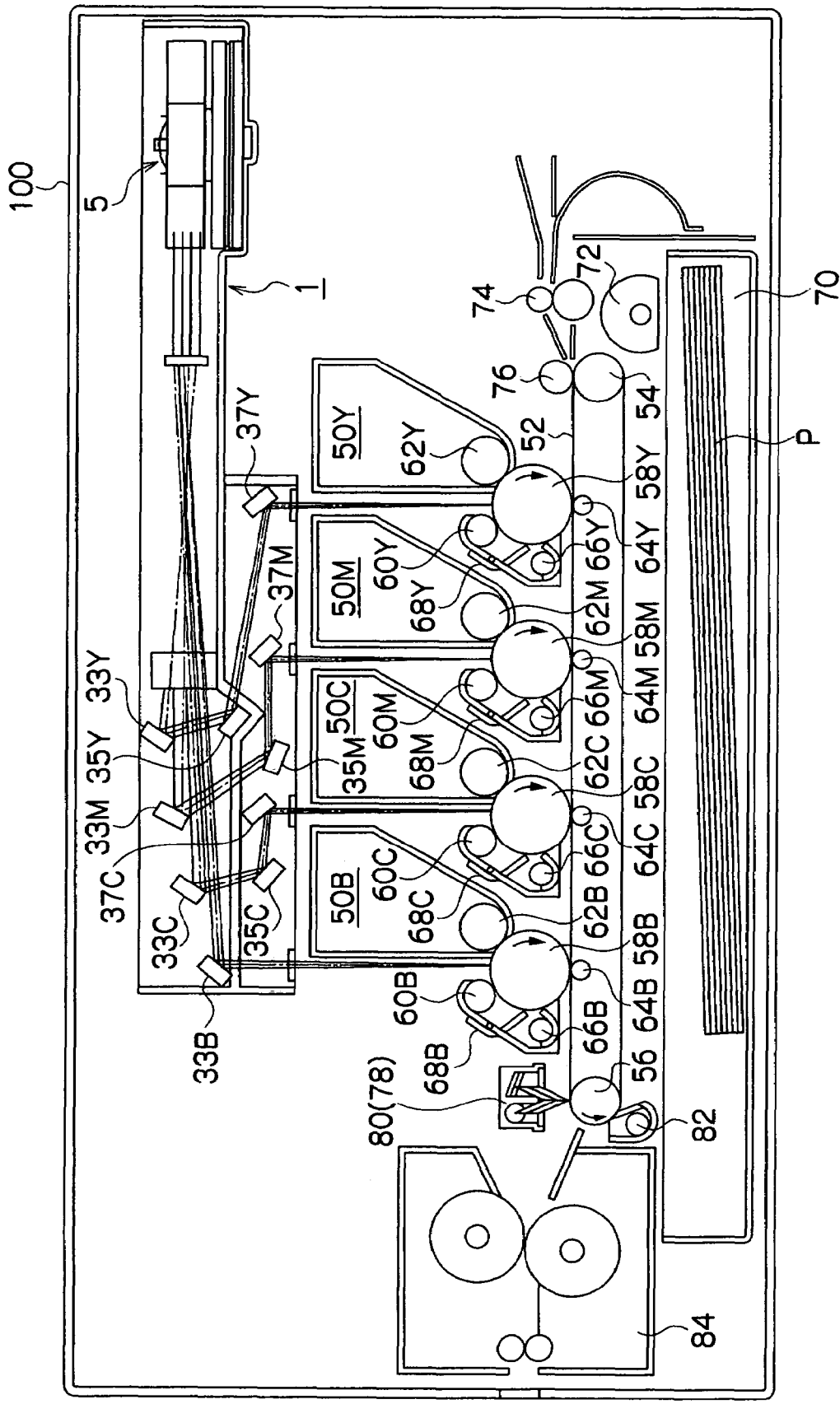
FIG. 1 is a schematic sectional view illustrating an image forming apparatus that uses a multi-beam optical scanning device according to an embodiment.

FIG. 1 illustrates a color image forming apparatus that uses the multi-beam optical scanning device according to the embodiment. In this kinds of the color image forming apparatus, four sets of four image data in which a color is separated into respective components of yellow (Y), magenta (M), cyan (C) and black (B) (black is for inking), and various devices which form images for the respective color components correspondingly to Y, M, C and B are normally used. For this reason, in the following explanation and the drawings, Y, M, C and B are added to the reference numerals, so that the image data for the respective color components and the devices corresponding to them are identified.

In FIG. 1, an image forming apparatus 100 has first through fourth image forming sections 50Y, 50M, 50C and 50B that form images for separated colors: yellow; magenta; cyan; and black.

The image forming sections 50Y, 50M, 50C and 50B are arranged in series in this order below the optical beam scanning device 1 correspondingly to positions from which laser beams L (Y, M, C and B) corresponding to the images of the color components are emitted via third reflecting mirrors 37Y, 37M and 37C, and first reflecting mirror 33B of a multi-beam optical scanning device 1, mentioned later, with reference to FIGS. 2 and 3.

A transport belt 52, which transports a transfer material (recording medium) to which images formed by the image forming sections 50 (Y, M, C and B) are transferred, is arranged below the respective image forming sections 50 (Y, M, C and B).

The transport belt 52 is bridged between a belt driving roller 56 and a tension roller 54 which rotate to a direction of an arrow by a motor, not shown. The transport belt 52 is rotated at a predetermined speed to a direction where the belt driving roller 56 rotates, and moves straight below the image forming sections 50 (Y, M, C and B).

The image forming sections 50 (Y, M, C and B) have photoconductor drums 58Y, 58M, 58C and 58B having a cylindrical drum shape and are formed rotatively to a clockwise direction in FIG. 1. Electrostatic latent images corresponding to the images are formed on the photoconductor drums 58Y, 58M, 58C and 58B, respectively.

Charging devices 60Y, 60M, 60C and 60B, developing devices 62Y, 62M, 62C and 62B, transfer devices 64Y, 64M, 64C and 64B, cleaners 66Y, 66M, 66C and 66B, and discharging devices 68Y, 68M, 68C and 68B are arranged around the photoconductor drums 58 (Y, M, C and B), respectively, in this order along the rotational direction of the photoconductor drums 58 (Y, M, C and B). The charging devices 60 (Y, M, C and B) apply a predetermined electric potential to the surfaces of the photoconductor drums 58 (Y, M, C and B). The developing devices 62 (Y, M, C and B) supply toner with colors corresponding to the electrostatic latent images formed on the surfaces of the photoconductor drums 58 (Y, M, C and B) so as to develop the images. The transfer devices 64 (Y, M, C and B) are opposed to the photoconductor drums 58 (Y, M, C and B) with the transport belt 52 intervening between the transfer devices 64 and the photoconductor drums 58 (Y, M, C and B), and transfer the toner images on the photoconductor drums 58 (Y, M, C and B) onto the transport belt 52 or a recording medium, namely, a recording paper P transported by means of the transport belt 52. The cleaners 66 (Y, M, C and B) remove residual toner on the photoconductor drums 58 (Y, M, C and B) after the toner images are transferred by the transfer devices 64 (Y, M, C and B). The discharging devices 68 (Y, M, C and B) eliminate residual potential on the photoconductor drums 58 (Y, M, C and B) after the toner images are transferred by the transfer devices 64 (Y, M, C and B).

Beams for writing the latent images onto the photoconductor drums 58 (Y, M, C and B) are one or a plurality of beams in a sub-scanning direction on the photoconductor drums 58 which is (are) guided by mirrors 37Y, 37M, 37C and 33B of the optical beam scanning device 1.

Laser beams LY, LM, LC and LB for the color components (possibly a synthesized beam of plural beams) are emitted onto the surfaces of the photoconductor drums 58 (Y, M, C and B) between the charging devices 60 (Y, M, C and B) and the developing devices 62 (Y, M, C and B) related with the respective color components.

A paper cassette 70, which houses recording media, namely, the paper P onto which the images formed by the image forming sections 50 (Y, M, C and B) are transferred, is arranged below the transport belt 52.

A feed roller 72 is arranged at one end of the paper cassette 70 in a vicinity of the tension roller 54. The feed roller 72 is formed into an approximately half-moon shape, and feeds the paper P housed in the paper cassette 70 one by one from the top.

A resist roller 74 is arranged between the feed roller 72 and the tension roller 54. The resist roller 74 matches a forward end of one piece of paper P taken out from the cassette 70 with a forward end of the toner image formed on the photoconductor drum 58B of the image forming section 50B (black).

An adsorption roller 76 is arranged substantially on an outer periphery of the tension roller 54 via the transport belt 52 between the resist roller 74 and the first image forming section 50Y in a paper running direction in a vicinity of the tension roller 54. The adsorption roller 76 provides predetermined electrostatic adsorptive power to one piece of paper P transported by the resist roller 74 at predetermined timing. An axial line of the adsorption roller 76 is parallel with an axial line of the tension roller 54.

Resist sensors 78 and 80 (since FIG. 1 is a front sectional view, only the backward sensor 80 is shown) are arranged substantially on an outer periphery of the belt driving roller 56 via the transport belt 52 at one end of the transport belt 52 in a vicinity of the belt driving roller 56. The resist sensors 78 and 80 detect a position of the image formed on the transport belt 52 or the paper P transported by the transport belt 52.

A transport belt cleaner 82 is arranged on the transport belt 52 corresponding to the outer periphery of the belt driving roller 56. The transport belt cleaner 82 removes toner or waste of the paper P adhered to the transport belt 52.

A fixing device 84 is arranged in a direction where the paper P transported by the transport belt 52 is separated from the belt driving roller 56 and is further transported. The fixing device 84 fixes the toner image transferred onto the paper P to the paper P.

Figure 2:
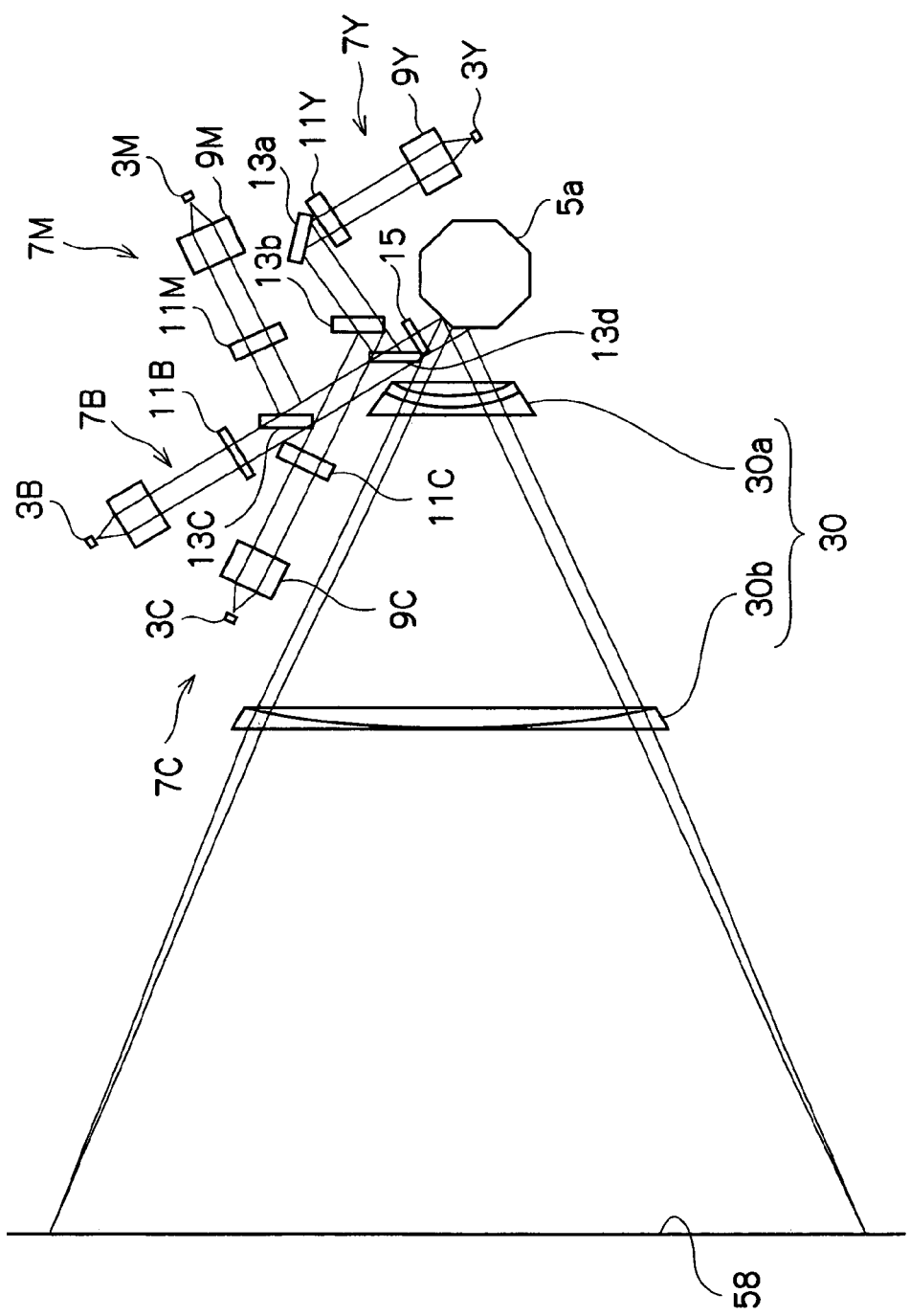
FIG. 2 is a schematic plan view illustrating an arrangement of optical members in the optical beam scanning device incorporated into the image forming apparatus of FIG. 1.
Figure 3:
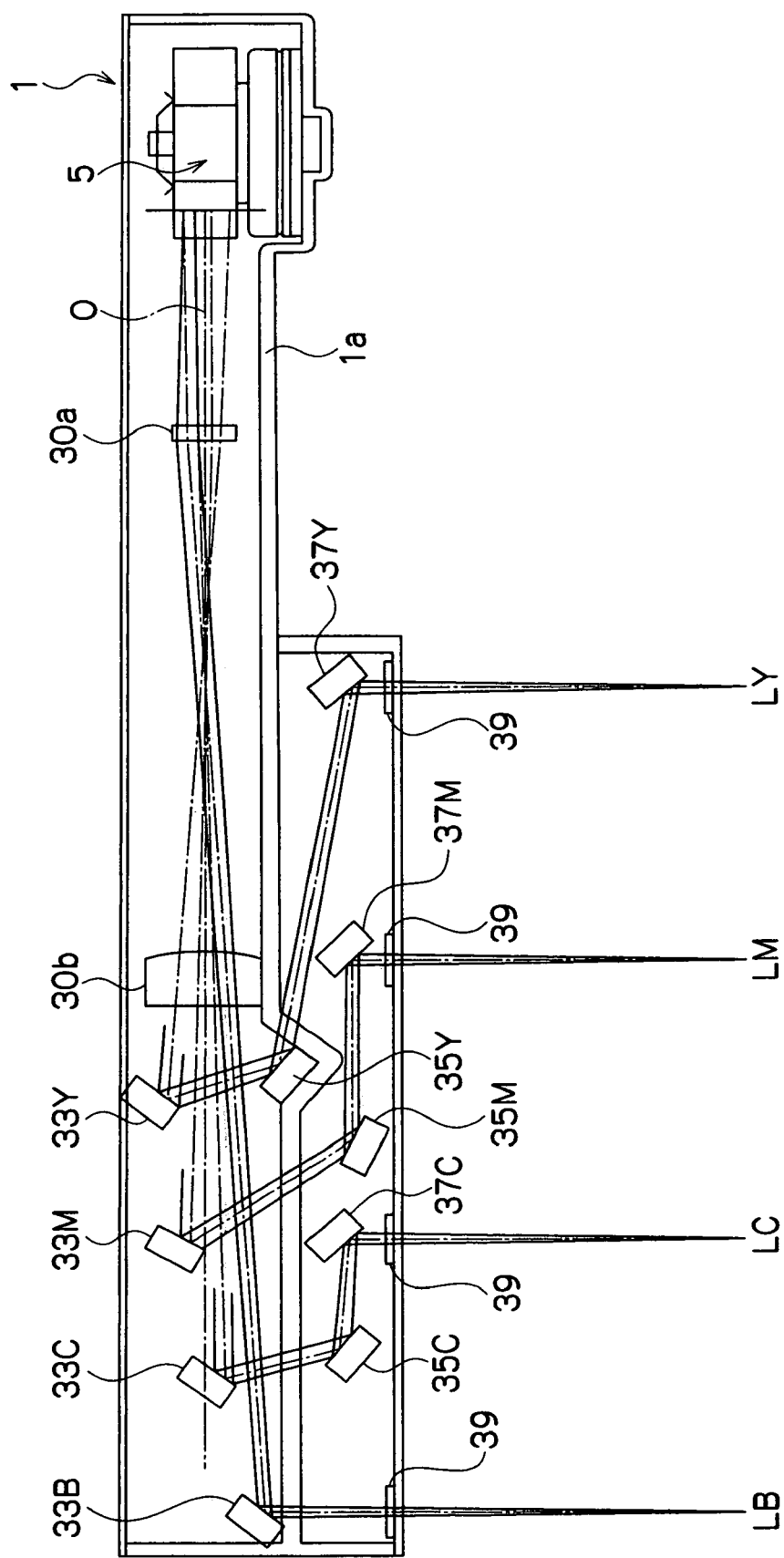
FIG. 3 is a schematic sectional view explaining a state that a reflecting point of a light deflecting device and a center of a post-deflection optical system in a scanning direction are cut in the optical beam scanning device of FIG. 2.

FIGS. 2 and 3 illustrates detailed structure of the multi-beam optical scanning device to be used in the color image forming apparatus shown in FIG. 1. In FIG. 1, a pre-deflection optical system of the multi-beam optical scanning device is omitted, but FIG. 2 shows the pre-deflection optical system. FIG. 2 illustrates developed reflection by means of reflecting mirrors, mentioned later, that separate the deflected light beams into laser beams for the respective color components.

As shown in FIG. 2, the multi-beam optical scanning device 1 has only one light deflecting device 5 as a deflecting unit that deflects the laser beams emitted from laser elements as light sources towards image surfaces arranged in predetermined positions, namely, predetermined positions of the photoconductive drums 58Y, 58M, 58C and 58B of the four image forming sections 50Y, 50M, 50C and 50B shown in FIG. 1 at a predetermined linear speed. In this specification, a direction where the laser beam is deflected by the light deflecting device 5 is called as a main scanning direction.

The light deflecting device 5 has a polygon mirror 5a where a flat mirror with a plurality of surfaces (for example, eight surfaces) is arranged into a regular polygon shape, and a motor 5b which rotates the polygon mirror 5a at a predetermined speed. The polygon mirror 5a is formed of aluminum, for example. Respective reflecting surfaces of the polygon mirror 5a are realized in such a manner that the polygon mirror 5a is cut along the sub-scanning direction as a surface including the direction where the polygon mirror 5a rotates, namely, the surface perpendicular to the main scanning direction, and a surface protective layer such as $SiO_2$ is deposited on a cut surface.

A post-deflection optical system 30 is provided between the light deflecting device 5 and the image surfaces. The post-deflection optical system 30 has first and second imaging lenses (so-called fθ lenses) 30a and 30b that give a predetermined optical property to the laser beam deflected to the predetermined direction by the reflecting surface of the light deflecting device 5. The first and the second imaging lenses 30a and 30b are designed cooperatively with each other so that the image surfaces and the reflecting points on the polygon mirror surfaces establish a schematically conjugate relationship in sub-scanning direction. As a result, the first and the second imaging lenses 30a and 30b prevent a fluctuation in the sub-scanning position on the image surfaces due to an influence of tilt of the reflecting surfaces in the polygon mirror 5a (tilt between angles and axial lines of the center axis of the reflecting surface). For this reason, a positive power is provided in the sub-scanning direction.

The first and the second imaging lenses 30a and 30b are cooperative with each other so that the image surfaces and the reflecting points on the reflecting surfaces establish the schematically conjugate relationship in order to prevent the fluctuation in the sub-scanning direction on the image surfaces due to the influence of the tilt of the reflecting surfaces of the polygon mirror 5a (tilt between the angles and the axial lines of the reflecting surfaces). For this reason, the first and the second imaging lenses 30a and 30b have the positive power in the sub-scanning direction.

Further, as shown in FIG. 3, the post-deflection optical system 30 has first reflecting mirrors 33Y, 33M, 33C and 33B, second reflecting mirrors 35Y, 35M and 35C, and third reflecting mirrors 37Y, 37M and 37C. The laser beam LB for black component emitted from the second imaging lens 30b of the post-deflection optical system 30 is reflected by the first reflecting mirror 33B so as to be emitted to the photoconductor drum 58B. Laser beams LY, LM and LC for the other color components emitted from the second imaging lens 30b are reflected by the first reflecting mirrors 33Y, 33M and 33C, the second reflecting mirrors 35Y, 35M and 35C, and the third reflecting mirrors 37Y, 37M and 37C, sequentially so as to be emitted to the photoconductor drums 58Y, 58M and 58C.

The optical beam scanning device 1 has four light sources 3Y, 3M, 3C and 3B including one or a plurality of laser elements that emit light beams to be led to the photoconductor drums 58 (Y, M, C and B), respectively. Even when the light sources 3 (Y, M, C and B) emit a plurality of laser beams including the laser elements, the laser beams from the light sources are combined with an interval such that paired laser beams from the laser elements generally become one beam.

Pre-deflection optical systems 7 (Y, M, C and B), which adjust sectional beam spot shapes of the laser beams L (Y, M, C and B) from the light sources 3 (Y, M, C and B) into predetermined shapes, are arranged between the light sources 3 (Y, M, C and B) and the light deflecting device 5.

After predetermined convergence is given to the emanative laser beams L (Y, M, C and B) emitted from the light sources 3 (Y, M, C and B) by finite focal lenses 9 (Y, M, C and B), the sectional beam shapes are adjusted into the predetermined shapes by stops (not shown in FIG. 2). Predetermined convergence is further given to the laser beams L (Y, M, C and B) which pass through the stops only in the sub-scanning direction by glass cylinder lenses 11 (Y, M, C and B). The glass cylinder lenses 11 (Y, M, C and B) are composed of, for example, BK7. The laser beams L (Y, M, C and B), thereafter, are synthesized into approximately one optical path (one in the main scanning direction, but incident angles to the reflecting surface of the light deflecting device 5 or positions are slightly different in the sub-scanning direction) by optical path synthesizing units 13a, 13b, 13c and 13d such as reflecting mirrors or beam splitters. The laser beams L (Y, M, C and B) are guided to the one reflecting surface of the light deflecting unit 5.

The finite focal lenses 9 (Y, M, C and B) are composed of a single lens in which, for example, an UV curing plastic aspherical lens, not shown, is laminated with a spherical glass lens or an aspherical glass lens.

This embodiment is characterized in that an environment change compensating optical element 15 having the function for compensating displacement of the sub-scanning direction due to an environment change (for example, temperature change) is provided onto the common optical path (approximately combined one optical path) for the laser beams L (Y, M, C and B) before reaching the light deflecting device 5. A free-form surface lens formed by plastic such as COP (cycloolefin polymer) or PMMA (polymethyl methacryl) is applied to the environment change compensating optical element 15. The environment change compensating optical element 15 has a negative power at least in a sub-scanning direction.

FIGS. 4A and 4B are conceptual explanatory diagrams of the environment change compensating optical element 15, FIG. 4A is a diagram in the case where the environment change compensating optical element 15 is not provided, and FIG. 4B is a diagram in the case where the environment change compensating optical element 15 is provided. Further, FIGS. 4A and 4B illustrate the optical path in the sub-scanning direction where the reflection on the reflecting surface 5R of the light deflecting device 5 is replaced by transmission surface. In FIGS. 4A and 4B, only the two of four laser beams for the color components (in this case, they are tentatively the laser beams LY and LB) are shown, and the first and the second imaging lenses (fθ lenses) 30a and 30b in the post-deflection optical system 30 are regarded as one lens having the function equivalent to the function in the case where two lenses are synthesized.

When the temperature change is taken into consideration, a glass lens is more preferable than a plastic lens as the lenses applied to the device. The first and the second imaging lenses (fθ lenses) 30a and 30b, however, need to secure sufficient length in the main scanning direction, and thus the plastic lenses are adopted after their weight and cost are taken into consideration.

In the case where the environment change compensating optical element 15 is not provided, the glass cylinder lenses 11Y and 11B are hardly influenced by the temperature change. For this reason, the laser beams LY and LB which pass through the glass cylinder lenses 11Y and 11B are hardly influenced by the temperature change, so as to advance the similar path. When temperature rises, however, the first and the second imaging lenses (fθ lenses) 30a and 30B composed of the plastic lenses are influenced by the state that as the dimension of the members become larger and the refractive index become smaller. As a result, the positive power is reduced, and when the laser beams reach the imaging surfaces (photoconductor drums 58Y and 58B), great displacement occurs in the sub-scanning direction. The paths shown by alternate long and short dash lines in FIG. 4A represent this case.

On the contrary, when the environment change compensating optical element 15 is provided, the laser beams LY and LB which pass through the glass cylinder lenses 11Y and 11B pass through the environment change compensating optical element 15 before they reach the first and the second imaging lenses (fθ lenses) 30a and 30b composed of the plastic lenses. When the plastic lenses having the negative power are adopted as the environment change compensating optical element 15, the environment change compensating optical element 15 functions so as to narrow the intervals between the laser beams on the reflecting surface 5R of the light deflecting device 5 when the temperature rises. That is to say, the environment change compensating optical element 15 functions to an opposite direction to the direction where the first and the second imaging lenses (fθ lenses) 30a and 30b composed of the plastic lenses function when the temperature rises. As a result, it functions so as to narrow emitting positions of the imaging surfaces (photoconductor drums 58Y and 58B) of the laser beams LY and LB. When the power and the incident angle of the environment change compensating optical element 15 are set, an emitting position change amount can be set freely and can be set to be approximately equal before and after the rise of the temperature.

A study is conducted on how to set the necessary compensating function (lens characteristic of the environment change compensating optical element 15) of the environment change compensating optical element 15. It is necessary to understand image shift and color shift due to the environment change (temperature change) of the entire device in order to set the necessary compensating function.

The study is conducted on the case of the two photoconductor drums shown in FIG. 5 (the two photoconductor drums for the yellow and black components are tentatively explained).

The interval between the laser beams LY and LB to the two photoconductor drums 58Y and 58B is designated by L, a radius of the photoconductor drums 58Y and 58B is designated by rd, an angle between an exposing point and a transfer point on the photoconductor drums 58Y and 58B is designated by α, a rotating speed of the photoconductor drums 58Y and 58B is designated by ωd, a shaft radius of the belt driving roller 56 is designated by rs, and an angular velocity of the belt driving roller 56 is designated by ωs. The equation (1) is established at the time of standard, and in order to overlap the images on one place of paper, exposure needs to be carried out with time difference T expressed by the equation (2) being provided between the timing of the writing with the laser beam LY and the timing of the writing with the laser beam LB.

$$rd \times \omega d \approx rs \times \omega s = v \quad (1)$$

$$T = L/v \quad (2)$$

(a) Influence of fluctuation in the emitting positions of the laser beams

Figure 6:
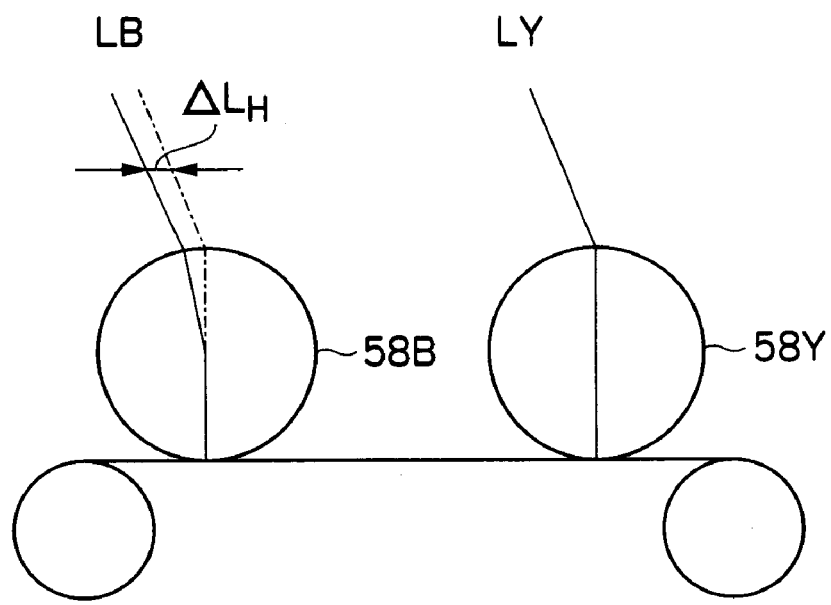
FIG. 6 is an explanatory diagram illustrating an influence of a fluctuation in scanning line positions (laser beam emitting positions)

When the standard sate shown in FIG. 5 is changed into a state shown in FIG. 6 that the interval of the laser beams LY and LB shifts only by ΔLH, the time at which the image written by the laser beam LB reaches the transfer point is delayed only by time ΔTH expressed by the equation (3). This means that the image by the laser beam LB shifts to the rear side (the sub-scanning direction: the right side in FIG. 6) only by a distance expressed by the equation (4).

$$\Delta TH \approx \Delta LH/v \quad (3)$$

$$v \times \Delta TH \approx \Delta LH \quad (4)$$

(b) Influence of fluctuation in the positions of the photoconductor drums

Figure 7:
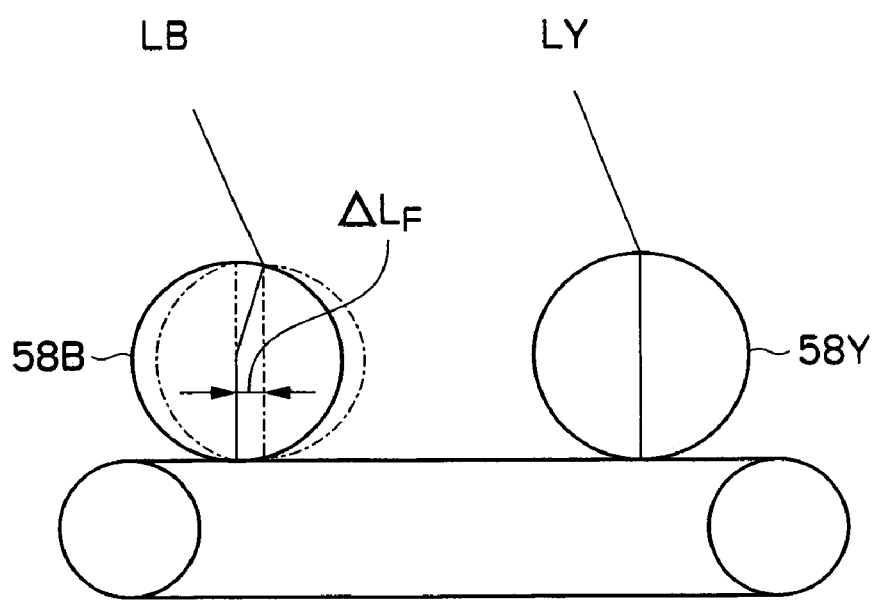
FIG. 7 is an explanatory diagram illustrating an influence of a fluctuation in positions of photoconductor drums.

When the standard state shown in FIG. 5 is changed into a state shown in FIG. 7 that the distance between the two photoconductor drums 58Y and 58B is shifted only by ΔLF, the time at which the image written by the laser beam LB reaches the transfer point is delayed only by time ΔTF expressed by the equation (5). This means that the image by the laser beam LB is shifted to the front side (the sub-scanning direction: the left side in FIG. 7) only by a distance expressed by the equation (6). When the distance between the two photoconductor drums 58Y and 58B is changed only by ΔLF, the transfer point of the image with the laser beam LB changes only by ΔLF. Totally, the image by the laser beam LB is shifted to the front side (the sub-scanning direction: the left side in FIG. 7) only by an absolute value expressed by the equation (7). "−" in the equation (7) designates a shift direction, and the shift to the right side is designated by "+".

$$\Delta TF \approx -\Delta LF/v \quad (5)$$

$$v \times \Delta TF \approx -\Delta LF \quad (6)$$

$$-2 \times \Delta LF \quad (7)$$

(c) Influence of fluctuation in the shaft radius

When the shaft radius of the belt driving roller 56 becomes large only by Δrs, a linear moving speed (v) of the belt driving roller 56 becomes faster only by Δrs×ωs. For this reason, the advancing distance of the belt (the medium on the belt) for time T becomes large by a value obtained by the equation (8). This means that the image by the laser beamLB is shifted to the rear side (the sub-scanning direction: the right side in FIGS. 6 and 7) only by the value obtained by the equation (8).

$$\Delta rs \times \omega s \times T = L \times \Delta rs/rs \quad (8)$$

The causes that bring the image shift in the sub-scanning direction are three kinds of fluctuations described in (a) to (c), and when there are two or three of fluctuations at the same time, the image by the laser beam LB is shifted from the standard state by a value obtained by the equation (9) according to the equations (4), (7) and (8).

$$\Delta LH - 2 \times \Delta LF + L \times \Delta rs/rs \quad (9)$$

A synthesized linear expansion coefficient (synthesized thermal expansion coefficient) of a member that houses the optical system such as the optical beam scanning device 1 of the embodiment (hereinafter called housing) is designated by αH, a synthesized linear expansion coefficient (synthesized thermal expansion coefficient) of a member that supports the photoconductor drums 58Y and 58B (hereinafter called a frame) is designated by αF, a synthesized linear expansion coefficient (synthesized thermal expansion coefficient) of the belt driving roller (shaft) 56 is designated by αS, and temperature rise is designated by t. At this time, the three fluctuations ΔLH, ΔLF and Δrs can be expressed by the equations (10) to (12) respectively.

$$\Delta LH = \alpha H \times L \times t \quad (10)$$

$$\Delta LH = \alpha F \times L \times t \quad (11)$$

$$\Delta rs = \alpha S \times rs \times t \quad (12)$$

When the equations (10) and (12) are applied to the equation (9), the equation (13) is obtained. The equation (13) expresses that when the temperature rises by t, the image by the laser beam LB is influenced by the synthesized linear expansion coefficients (synthesized thermal expansion coefficients) of the respective sections so as to be shifted to the rear side (the sub-scanning direction: the right side in FIG. 5) only by the value obtained by the equation (13) from the standard state shown in FIG. 5.

$$\alpha H \times L \times t - 2 \times \alpha F \times L \times t + L \times \alpha S \times rs \times t/rs = (\alpha H - 2 \times \alpha F + \alpha S) \times (L \times t) = \Delta \quad (13)$$

According to the equation (13), it is found that when the temperature rises by t, the emitting position of the laser beam LB may be moved from the position before the rise to an opposite direction only by the same amount as the absolute amount Δ expressed by the equation (13) (−Δ). The above explanation is given assuming that only the image by the laser beam LB changes, but both the emitting positions of the laser beams LB and LY change. The equation (13), therefore, expresses that when the temperature rises by t, the pitch between the laser beams LB and LY is changed only by −Δ. That is to say, the emitting positions of the photoconductor drums for the laser beams LB and LY are not fixed but the pitch between the emitting positions of the laser beams LB and LY is relatively moved only by −Δ which is opposite to the amount expressed by the equation (13). As a result, even if the ambient environment changes (particularly the temperature change), a plurality of images are not displaced (precise color registration is maintained).

For simplification of the explanation, the case of the two laser beams LB an LY is explained, but like the above embodiment, the similar function is applied to the case of the four laser beams LY, ML, LC and LB.

Only when the pitch between the beams in the sub-scanning direction expands only by αH×BP×t (here, BP is the gap between the beam positions in the sub-scanning direction on the image surfaces at the time of developing the optical path reflection from the deflecting surface to the image surfaces), the expansion of the optical system housing is just the same as the fluctuation in the gap of the laser beams from the housing.

For this reason, the beam positions of the surfaces to be scanned (corresponding to the surfaces of the photoconductor drums) at the time of developing the reflecting mirrors are shifted only by Δ' expressed by the equation (13'), occurrence of a shift of color overlapping due to temperature change can be prevented. As a result, an amount of the color shift without registration control can be suppressed, or the time interval of the registration control can be enlarged.

$$-(\alpha H - 2 \times \alpha F + \alpha S) \times (L \times t) + \alpha H \times BP \times t = \Delta' \quad (13')$$

The environment change compensating optical element 15, as explained with reference to FIG. 4B, suppresses the displacement in the sub-scanning direction on the surface to be scanned at the time of temperature change, but cannot completely suppress the shift of color overlapping by only setting the displacement of the beams to 0. For this reason, when the temperature rises by t, the characteristic and the shape of the environment change compensating optical element 15 are selected so that the beam positions on the surface to be scanned at the time of developing the reflecting mirrors shift only by $-(\alpha H - 2 \times \alpha F + \alpha S) \times (L \times t) + \alpha H \times BP \times t$. As a result, the occurrence of the shift of color overlapping (error of color registration) due to temperature change can be prevented, and the amount of the color shift (error of color registration) without the registration control is suppressed or the time interval of the registration control can be increased.

In general, since the frame and the shaft are formed by iron materials, and the housing is formed of aluminum or plastic, $\alpha H > \alpha F \approx \alpha S$ is established. For this reason, $-(\alpha H - 2\alpha F + \alpha S) \times L < 0$ is obtained. As a result, when the temperature rises, it is desirable that the increase in the interval in the sub-scanning direction is smaller than $\alpha H \times BP \times t$ as the optical system.

The optimal optical power arrangement including the environment change compensating optical element 15 is carried out, so that the optical system, which suppress the fluctuation in the beam positions in the sub-scanning direction and reduces temperature dependency of the imaging surfaces in the sub-scanning direction, can be provided.

(A-1) First Concrete Example of the Embodiment

The optical beam scanning device and the image forming apparatus of the above-mentioned embodiment are explained according to the first concrete example.

In the first concrete example, the material of the optical system housing is an aluminum die cast with linear expansion coefficient of $\alpha H = 2.1 \times 10^{-5}$, and the material of the frame for defining the intervals between the photoconductor drums is an aluminum die cast with linear expansion coefficient of $\alpha F = 2.1 \times 10^{-5}$. The material of the transfer belt driving shaft is free-cutting steel with linear expansion coefficient of $\alpha S = 1.15 \times 10^{-5}$, and the interval L between the photoconductor drums (for black and yellow) on both ends is 225 mm.

In the case where temperature rises by 15° C. (t=15), the ideal value $\Delta'$ as a change amount of the distance between the beams on both ends in the sub-scanning direction can obtain 0.032 according to the equation (13') (this means that when the emitting positions in the sub-scanning direction do not shift at all even if temperature changes, the shift of the color overlapping of 32 μm occurs).

FIGS. 8 to 11 are explanatory diagrams of data about the optical beam scanning device 1 which can realize approximately 32 μm as the change mount $\Delta'$ of the distance between the beams on both the ends in the sub-scanning direction when the temperature rises by 15° C.

FIGS. 8 to 11 illustrate the case where when a diameter of an inscribed circle of the polygon mirror 5a is 40.0 mm, the main scanning direction is a y direction, the sub-scanning direction is a z direction, and the optical axis direction is an x direction (light propagates to "+" in pre-deflection optical system, and propagates to "−" in post-deflection optical system), the rotating center position of the polygon mirror 5a is such that the y direction is 17.2 mm and the z direction is 10.1 mm on a local coordinate system of the reflecting surfaces of the polygon mirror 5a. An definitional equation of the lens surfaces in these drawings is the equation (14), and in this concrete example, ay is 1 and az is 1.

$$x = \frac{cuy \times y^2 + cuz \times z^2}{1 + \sqrt{1 - ay \times cuy^2 \times y^2 - az \times cuz^2 \times z^2}} + \sum a_{bn} \times y^l \times z^m \quad (14)$$

FIG. 8 illustrates curvature and the interval (TH) on the optical axes on the surfaces of the optical elements, and refractive index of the optical elements. The distances between the adjacent surfaces of the optical elements are common among the laser beams LY (in the drawing, RAY 1, and the same is applied to the other ones), LM (RAY2), LC (RAY3) and LB (RAY4) when the number is written in common row, and are different among the laser beams LY (RAY1), LM (RAY2), LC (RAY3), and LB (RAY4) when the number is written in ray1~ray4 row. FIG. 8 describes data about the emitting surfaces and thereafter of the finite focal lenses 9Y, 9M, 9C and 9B, and the distances between the finite focal lenses 9Y, 9M, 9C and 9B and the imaging positions are 1159.4 mm, 1106.0 mm, 1136.0 mm and 1202.3 mm, respectively.

FIG. 9 shows eccentricity (shift, de-center) and tilt of the optical elements on the local coordinate system, and the optical elements are arranged with eccentricity and the tilt shown in FIG. 9. In FIGS. 8 and 9, the surface Nos. are the same.

In FIGS. 8 and 9, the surface No. "2" shows a curved surface side of the glass cylinder lenses 11 (Y, M, C and B), and the surface No. "3" shows a plane side. The distance in the surface No. "4" represents a common distance up to the incident surface of the optical elements in the surface No. "5" among the laser beams LY (RAY1), LM (RAY2), LC (RAY3), and LB (RAY4). The distance described on the surface No. "3" represents a difference between the common distance and the actual distance for each laser beam. The surface Nos. "5" and "6" show the incident surface and the emission surface of the beam splitter as the optical path synthesizing unit (13d), respectively.

The surface Nos. "7" and "8" show the incident surface and the emission surface of the plastic lens as the environment change compensating optical element 15. A curved surface polynomial coefficient of the incident surfaces is shown in FIG. 10A, and a curved surface polynomial coefficient of the emission surfaces is shown in FIG. 10B. As is clear from FIGS. 8, 10A and 10B, the environment change compensating optical element 15 has a curved surface in the main scanning direction, and has a negative power in order to compensate temperature characteristic of the post-deflection optical system having the positive power in the main scanning direction. The emitting position shift of the image surfaces due to temperature change which is smaller than that in the sub-scanning direction occurs also in the main scanning direction, and the curved surface in the main direction compensates this shift. FIG. 11 shows a paraxial power of the environment change compensating optical element 15 (plastic lens), and it has a negative power in the sub-scanning direction (and the main scanning direction).

The surface Nos. "9" and "10" show the incident surface and the emission surface of a cover glass (not shown in FIG. 2) which covers the polygon mirror 5a on the pre-deflection side. The surface No. "11" shows the deflection surface, and the surface Nos. "12" and "13" show the incident surface and the emission surface of the cover glass on the post-deflection side.

The surface Nos. "14" and "15" show the incident surface and the emission surface of the plastic lens as the first imaging lens 30a, a curved surface polynomial coefficient of the incident surface is shown in FIG. 10C, and a curved surface polynomial coefficient of the emission surface is shown in FIG. 10D. The surface Nos. "16" and "17" show the incident surface and the emission surface of the plastic lens as the second imaging lens 30b, a curved surface polynomial coefficient of the incident surface is shown in FIG. 10E, and a curved surface polynomial coefficient of the emission surface is shown in FIG. 10F.

The surface No. "18" shows the incident surface of the cover glass (not shown in FIG. 2) with respect to the entire optical beam scanning device 1, and the surface No. "19" shows the emission surface. The distance described in the surface No. "20" shows the common distance up to the image surfaces (the surfaces of the photoconductor drums) among the laser beams LY (RAY1), LM (RAY2), LC (RAY3), and LB (RAY4), and the distance described in the surface No. "19" shows a difference between the common distance and the actual distances for each laser beam.

When the optical beam scanning device 1 of the concrete example is applied, as shown in FIG. 12, the laser beam LY (RAY1; yellow) and the laser beam LB (RAY4; black) move to a direction where they spread 25 μm wider than the housing expansion due to the temperature rise of 15° C. That is to say, the laser beams move to the direction where the registration shift amount of 32 μm when the emitting positions of the laser beams do not move is canceled. For this reason, even if the temperature rises by 15° C., the yellow and black overlapping shifts only by 7 μm.

Similarly, the relationship between the laser beams LM (RAY2; magenta) and LB (RAY4; black) is such that L=75× 2=150, and the registration shift amount when the light beams do not move is 22 μm. Since the relative distance between both the laser beams, however, moves 16 μm to the canceling direction, even if temperature rises by 15° C., the magenta and black overlapping shifts only by 6 μm. The relationship between the laser beams LC (RAY3; cyan) and LB (RAY4; black) is such that L=75, and the registration shift amount when the beams do not move is 11 μm. Since the relative distance of both the laser beams, however, moves by 14μ to the canceling direction, even if temperature rises by 15° C., the cyan and black overlapping shifts only by 3 μm.

Further, a defocus change amount in the main scanning direction and the sub-scanning direction is suppressed to not more than 0.3.

(A-2) Second Concrete Example of the Embodiment

The second concrete example of the optical beam scanning device and the image forming apparatus according to the embodiment are explained below.

In the second concrete example, the material of the optical system housing is carbon fiber reinforced polycarbonate resin with linear expansion coefficient of $\alpha H=2.25\times10^{-5}$, and the material of the frame which defines the intervals between the photoconductor drums is cold-rolled steel plate with linear expansion coefficient of $\alpha F=1.2\times10^{-5}$. The material of the transfer belt driving shaft is stainless steel with linear expansion coefficient of $\alpha S=1.04\times10^{-5}$, and the interval L between the photoconductor drums on both ends (for black and yellow) is 225 mm.

In the case where temperature rises by 15° C. (t=15), the ideal value Δ' as a change amount of the distance between the beams on both ends in the sub-scanning direction can obtain −0.030 according to the equation (13') (this means that when the emitting positions in the sub-scanning direction do not shift at all even if temperature changes, the shift of the color overlapping of 30 μm occurs).

In the second concrete example, a member which defines heights of the light source (LD), the limited focal lenses and the glass cylinder lenses of the pre-deflection optical system is separated from the housing that holds all the entire optical parts. Concretely, this member is made of a metal matrix composite (ceramic reinforcement is used as a filler so as to be combined with metal matrix). The metal matrix composites with different thickness are sandwiched between the optical housing, the light sources (LD), the limited focal lenses and the glass cylinder lenses, so that the positions in the sub-scanning directions are made to be different.

The post-deflection optical system of the second concrete example is the same as the post-deflection optical system of the first concrete example.

FIGS. 13 to 16 are diagrams corresponding to FIGS. 8 to 11 according to the first concrete example, and show only the pre-deflection optical system.

In the second concrete example, as shown in FIG. 17, when the temperature rises by 15° C., the laser beams LY (RAY1; yellow) and LB (RAY4; black) move to a direction where they become 5 μm smaller than the direction in the case of the housing expansion. That is to say, the beams LY and LB move to the direction where the registration shift amount of 30 μm in the case where the laser beam emitting positions do not move is canceled. For this reason, even when temperature rises by 15° C., the yellow and black overlapping shifts only by 25 μm (this value is large, but when the plastic lens with negative power is not provided to the pre-deflection optical system, as mentioned later, the shift is 114 μm, and thus 25 μm is very smaller than 114 μm).

In the second concrete example, the defocus change amount in the main scanning direction and the sub-scanning direction is suppressed to not more than 0.3.

In the second concrete example, when temperature rises, the intervals of the beams on the surfaces to be scanned can be small.

FIGS. 18 to 20 illustrate data about the optical systems in a comparative example. In the comparative example, the plastic lens is not provided as the environment change compensating optical element 15. The post-deflection optical system in the comparative example is similar to that in the second concrete example.

FIG. 18 is a diagram corresponding to FIG. 13 in the second concrete example, FIG. 19 is a diagram corresponding to FIG. 14 in the second concrete example, and FIG. 20 is a diagram corresponding to FIG. 16 in the second concrete example.

In the comparative example, as shown in FIG. 21, the laser beams LY (RAY1; yellow) and the laser beam LB (RAY4; black) move to the direction where they spread 84 μm when temperature rises by 15° C.

In the combination example of the materials of the housing, the frame member that defines the intervals between the photoconductor drums and the transfer belt driving shaft in the first concrete example, the registration shifts 84 μm with respect to the shift of 32 μm in the case where the laser beam emitting positions do not move. For this reason, when temperature rises by 15° C., the yellow and black overlapping shifts by 52 μm.

In the combination example of the materials of the housing, the frame member that defines the intervals between the photoconductor drums and the transfer belt driving shaft in the second concrete example, the registration shifts by 84 µm to the opposite direction in addition to the registration shift amount of 30 µm in the case where the beams do not move. For this reason, when temperature rises by 15° C., the yellow and black overlapping shifts by 114 µm.

It is clear that the provision of the environment change compensating optical element 15 (plastic lens) can suppress the color overlapping due to the temperature change.

Further, from the comparison between FIGS. 21 and 12 and the comparison between FIGS. 21 and 17, the defocus change amount in the main scanning direction and the sub-scanning direction in the comparative example is larger than that in the first and the second concrete examples.

Even when the beam waist positions in the sub-scanning direction changes due to temperature change in the post-deflection optical system, the environment change compensating optical element 15 (plastic lens) is provided to the pre-deflection optical system, so that the imaging surfaces are shift to the opposite direction to the direction where the shift occurs in the post-deflection optical system and correction can be made. As a result, the shift of the color overlapping in the sub-scanning direction can be suppressed, and the color shift amount without the registration control can be suppressed, or the time intervals of the registration control can be increased.

Not only in the sub-scanning direction but also in the main scanning direction, the environment change compensating optical element 15 (plastic lens) is provided to the pre-deflection optical system, so that the similar effect can be produced in order to prevent defocus due to environment change.

(B) Another Embodiment

The above embodiment explains the image forming apparatus where maximally four images are overlapped with one another, but the present invention can be applied to an image forming apparatus where the maximum number of images to be overlapped is smaller or larger than four. Further, the color components of the images to be overlapped are not limited to different color components.

The above embodiment explains that all the laser beams are guided onto the one surface of the polygon mirror, but the present invention can be suitably applied to an apparatus which uses the two surfaces of the polygon mirror.

The above embodiment explains the environment change compensating optical element 15 which is the lens (plastic lens as one example) having the negative power, but another kind of optical element having similar incident and emission characteristics may be used. For example, transmitting or reflecting diffraction grating with non-uniform pitch can be used.

Further, the above embodiment explains that the compensating function of the environment change compensating optical element 15 is determined according to the equation (13'), but the equation (13') does not have to be considered for the compensating function. For example, when the temperature rise in the scanning optical unit is larger than the outside of the unit, as explained with reference to FIG. 4B, the compensating function may be determined so as to have temperature dependency opposite to that of the imaging lenses (first and second imaging lenses). That is to say, the compensating function does not have to be determined taking the linear expansion coefficient of the materials of the optical housing, the frame which defines the intervals between the photoconductor drums, and the transfer belt driving shaft into consideration.

The above embodiment explains the member which compensates the image shift according to the equation (13) is mainly composed of the environment change compensating optical element 15 provided to the position common among the plural laser beams in the pre-deflection optical system. The member, which compensates the image shift obtained by the equation (13) by means of movement of opposite positive or negative amount, may be provided on the optical paths of some of the plural laser beams. For example, the environment change compensating optical element 15 may be provided to positions obtained by synthesizing the two optical paths.

The above embodiment explains that the linear expansion coefficients of three materials of the optical housing, the frame which defines the intervals between the photoconductor drums and the transfer belt driving shaft are taken into consideration, but a number of the materials to be considered may be smaller or larger than three.

What is claimed is:

1. An optical beam scanning device, comprising:
   a single light deflecting device;
   a pre-deflection optical system that allows light beams from a plurality of light sources to enter the light deflecting device;
   a post-deflection optical system including a first optical element for imaging the reflected light beams from the light deflecting device on a plurality of surfaces to be scanned for the respective light beams; and
   a second optical element having a negative power opposite to a power of the first optical element in a sub-scanning direction, the second optical element disposed in the pre-deflection optical system which allows the light beams from the light sources to pass therethrough, and the second optical element configured to separately enter the light beams imaged on the plurality of scanned surfaces from the light sources to enter in the sub-scanning direction at predetermined intervals.

2. The optical beam scanning device according to claim 1, further comprising a plurality of third optical elements corresponding to the light sources which are provided between the light sources and the second optical element and give predetermined characteristics to the light beams from the light sources.

3. The optical beam scanning device according to claim 1, wherein the second optical element is a lens.

4. The optical beam scanning device according to claim 1, wherein the second optical element is a transmitting diffraction grating with non-uniform pitch.

5. An optical beam scanning device, comprising:
   a single light deflecting device;
   a pre-deflection optical system that allows light beams from a plurality of light sources to enter the light deflecting device; and
   a post-deflection optical system including a first optical element for imaging reflecting light beams from the light deflecting device on surfaces to be scanned for respective light beams,
   wherein characteristics of components including the light deflecting device, the pre-deflection optical system and the post-deflection optical system are designed so that intervals of the light beams from the light sources on the surfaces to be scanned at the time of developing an optical path reflection by mirrors from a deflecting surface to the surfaces to be scanned become smaller as temperature rises.

6. The optical beam scanning device according to claim 5, wherein the pre-deflection optical system has a second optical element having a positive or negative power opposite to a power of the first optical element in the sub-scanning direction in a position where the light beams from the light sources pass commonly and the light beams from the light sources enter the second optical element in the sub-scanning direction at predetermined intervals.

7. An image forming apparatus, comprising:

an optical beam scanning device having a single light deflecting device, a pre-deflection optical system that allows light beams from a plurality of light sources to enter the light deflecting device, and a post-deflection optical system including a first optical element for imaging reflected light beams from the light deflecting device on surfaces to be scanned for respective light beams;

a photoconductor having a surface to be scanned on which a latent image is formed based on the light beams from the light beam scanning device; and a second optical element disposed in the pre-deflection optical system, where the light beams from the light sources pass commonly and the light beams from the light sources enter the second optical element in a sub-scannning direction at predetermined intervals, and has a negative power opposite to a power of the first optical element in the sub-scanning direction.

8. An image forming apparatus, comprising:

an optical beam scanning device which has a single light deflecting device, a pre-deflection optical system that allows light beams from a plurality of light sources to enter the light deflecting device, and a post-deflection optical system including a first optical element for imaging reflected light beams from the light deflecting device on surfaces to be scanned for respective light beams, and in which characteristics of components of the light deflecting device, the pre-deflection optical system and the post-deflection optical system are designed so that intervals between the light beams from the light sources on the surfaces to be scanned at the time of developing optical path reflection from a deflecting surface to the surfaces to be scanned become smaller as temperature rises; and a photoconductor having a surface to be scanned on which a latent image is formed based on the light beams from the optical beam scanning device.

* * * * *